United States Patent
Banks (10) Patent No.: US 7,594,034 B2
(45) Date of Patent: Sep. 22, 2009

(54) MANAGING FOREIGN-OWNED FIELDS IN VERSIONED MESSAGES

(75) Inventor: Donald Banks, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 579 days.

(21) Appl. No.: 11/390,583

(22) Filed: Mar. 27, 2006

(65) Prior Publication Data

US 2007/0226370 A1 Sep. 27, 2007

(51) Int. Cl.
*G06F 15/16* (2006.01)
(52) U.S. Cl. .................. 709/246; 709/204; 709/205; 709/206
(58) Field of Classification Search ........... 709/246, 709/204, 205, 206; 703/27; 717/131
See application file for complete search history.

(56) References Cited

U.S. PATENT DOCUMENTS

| | | | | |
|---|---|---|---|---|
| 5,119,465 | A * | 6/1992 | Jack et al. | 717/137 |
| 5,524,253 | A * | 6/1996 | Pham et al. | 709/202 |
| 5,950,230 | A | 9/1999 | Islam et al. | |
| 6,085,333 | A | 7/2000 | DeKoning et al. | |
| 6,148,410 | A | 11/2000 | Baskey et al. | |
| 6,418,116 | B1 | 7/2002 | Egoshi | |
| 6,496,940 | B1 * | 12/2002 | Horst et al. | 714/4 |
| 6,604,177 | B1 | 8/2003 | Kondo et al. | |
| 6,622,265 | B1 | 9/2003 | Gavin | |
| 6,687,851 | B1 | 2/2004 | Somers et al. | |
| 6,738,975 | B1 * | 5/2004 | Yee et al. | 719/310 |
| 6,785,840 | B1 | 8/2004 | Smith et al. | |
| 6,856,591 | B1 | 2/2005 | Ma et al. | |
| 6,865,591 | B1 | 3/2005 | Garg et al. | |
| 6,874,139 | B2 * | 3/2005 | Krueger et al. | 717/127 |
| 6,886,107 | B2 | 4/2005 | Walsh et al. | |
| 6,954,877 | B2 * | 10/2005 | Earl et al. | 714/13 |
| 7,249,132 | B2 * | 7/2007 | Florkey et al. | 707/10 |
| 7,383,541 | B1 * | 6/2008 | Banks et al. | 717/131 |
| 2001/0052067 | A1 | 12/2001 | Klein | |
| 2003/0056138 | A1 | 3/2003 | Ren | |
| 2005/0021713 | A1 * | 1/2005 | Dugan et al. | 709/223 |
| 2005/0273521 | A1 * | 12/2005 | Patrick et al. | 709/246 |
| 2007/0061487 | A1 * | 3/2007 | Moore et al. | 709/246 |
| 2008/0123668 | A1 * | 5/2008 | Tan et al. | 370/400 |
| 2008/0313126 | A1 * | 12/2008 | Fredriksson | 706/59 |

OTHER PUBLICATIONS

Cisco Systems, Nonstop Forwarding with Stateful Switchover on the Cisco Catalyst 6500, White Paper, 16 pages, copyright 2005 Cisco Systems, Inc., San Jose, CA; downloaded from the Internet: <http://www.cisco.com/application/pdf/en/us/guest/products/ps708/c1244/cdccont_0900aecd801c5cd7.pdf>.

* cited by examiner

*Primary Examiner*—Saleh Najjar
*Assistant Examiner*—Waseem Ashraf
(74) *Attorney, Agent, or Firm*—Charles E. Krueger (57) ABSTRACT

A method and system for transforming client messages including foreign-owned fields that utilizes an infrastructure to transform the foreign-owned fields independently of the transformation of the client message.

11 Claims, 6 Drawing Sheets

MANAGING FOREIGN-OWNED FIELDS IN VERSIONED MESSAGES

BACKGROUND OF THE INVENTION

Operators of both enterprise and service provider networks strive to deliver 100% user access to data resources. Network devices, such as switches and routers, that are deployed in critical parts of enterprise and service provider networks must achieve close to 100% high availability (HA).

In order to achieve HA, network devices include redundant route processors. Redundancy on a network device requires two route processors per chassis and a redundancy protocol to synchronize information between these two instances.

The route processor that boots first becomes the Active or in the case where the boot together they negotiate which is the Active. The Active is responsible for control-plane and forwarding decisions. The second processor is the Standby, which does not participate in the control-plane or data-plane decisions. The Active synchronizes configuration and protocol state information to the Standby. As a result, the Standby is ready to take over the Active responsibilities if the Active fails. This "take-over" process from the Active to the Standby is referred to as switchover.

The switchover time has 3 (or 4, depending on implementation) parts. The first and most important part is the time it takes to continue forwarding after a switchover event. This is hardware architecture dependent but can be as little as zero seconds and as much as 2 seconds. The second part is how long it takes the protocol applications to greet their peers after the switchover event. This part is secondary because it is "protected" by timers that allow a certain amount of time to elapse without hearing from a peer before the neighbor declares them down. This time is typically 5-6 seconds and the timers are typically greater than that. The third part is how long it takes NSF routing protocols to reconverge. This time is hidden by continuing to forward using the Forwarding Information Base that was current at the time of failure until the tables are updated due to convergence. The optional fourth part depends on configuration and whether an upgrade is occurring that requires line cards to be reloaded or not. This part does not apply to multi-chassis configurations. It is the time it takes to update and reconfigure the line cards after a switchover with new images and data when required. This part is referred to as "Minimum Disruptive Reload" (MDR) and can be as little as 0.5 seconds to several seconds. This disrupts forwarding and affects the first part although they the parts are not concurrent (i.e., they typically appear as two separate small interruptions of service)

Various techniques have been developed to reduce the switchover time. The assignee of the present application has developed a set of features called NonStop Forwarding (NSF) with Stateful SwitchOver (SSO).

NSF with SSO reduces the mean time to repair (MTTR) by allowing extremely fast switchovers with 0 to 3 seconds of packet loss. NSF with SSO can be deployed in the most critical parts of an enterprise or service provider network. It is an essential feature for single points of termination in the network, and it minimizes downtime when voice over IP (VoIP), video, and other packet loss-sensitive applications are involved.

In-Service Software Upgrade (ISSU) is SSO for different versions of the Internet Operating System (IOS®). For example, a Standby could be upgraded on a network device that runs a later version of IOS® than that run by the Active.

ISSU provides a process and supporting infrastructure to allow customers to easily manage an upgrade or downgrade and preserves the existing SSO execution model. An important feature of ISSU is allowing applications to add, delete, and modify message types and data content as required and maintaining interoperation between different releases of the system and of the applications.

This is achieved by providing an ISSU infrastructure that allows applications to provide dynamic message transformation functions to upgrade or downgrade messages as appropriate based on session negotiation results. The ISSU infrastructure provides services for managing sessions between peer endpoints to establish a connection and message transformation services for transforming messages between versions as required.

Figure 1A:
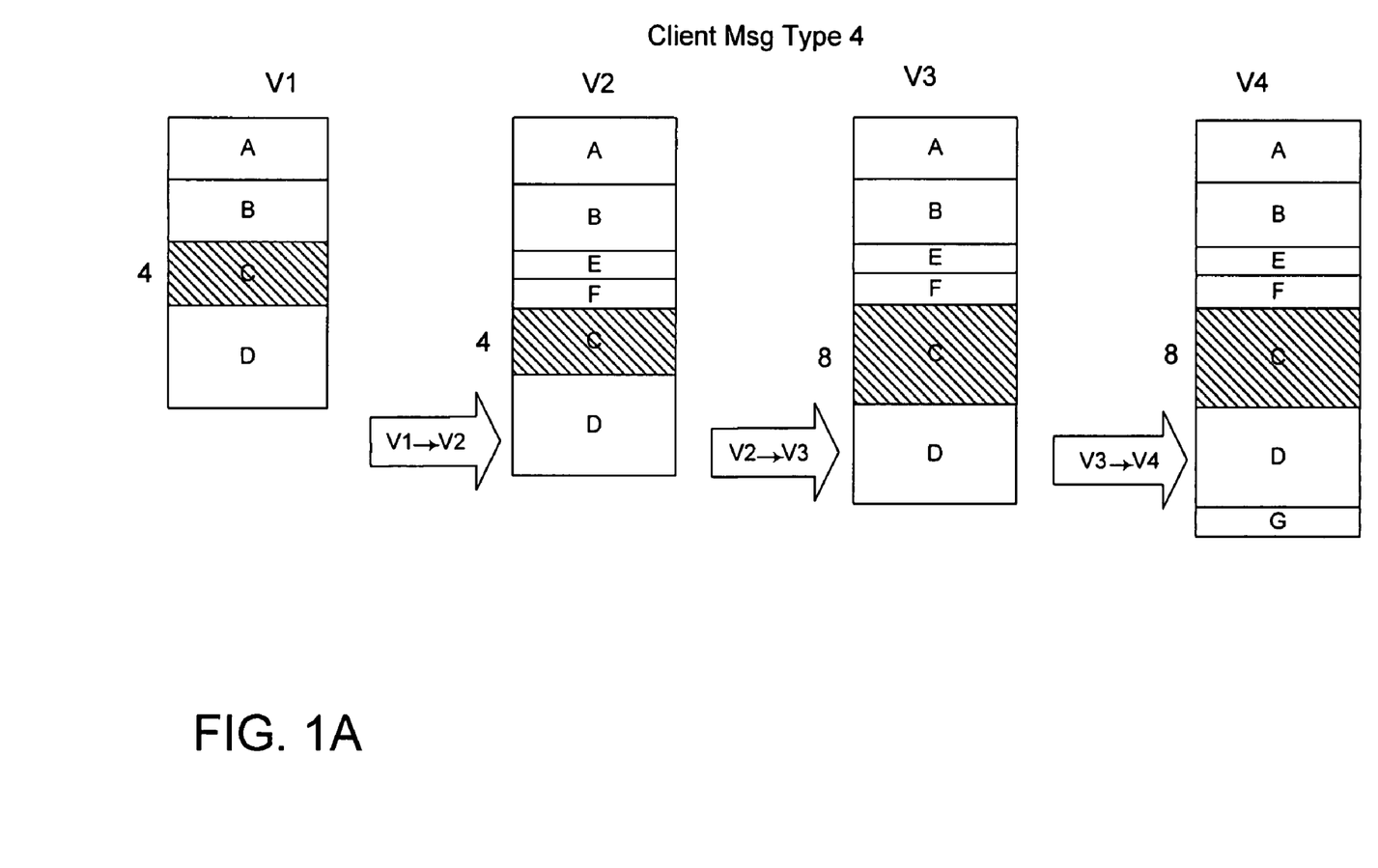
FIG. 1A is a diagram depicting conversion of different versions of a message.

The requirement for message transformation services is illustrated in FIG. 1A. FIG. 1A depicts an example of an ISSU client, i.e., a component that utilizes services of the ISSU infrastructure, that has a message of type 4 which has four versions. Note that version 2 includes fields "E" and "F" that are not present in version 1. Thus, if a first endnode sends version 1 of message 4 to a second endpoint expecting version 2 of message type 4, a message transformation function must be called to transform version 1 into version 2 by adding the fields "E" and "F". This all takes place automatically due to the negotiation done when the message session is established between the two endpoints.

Figure 1B:
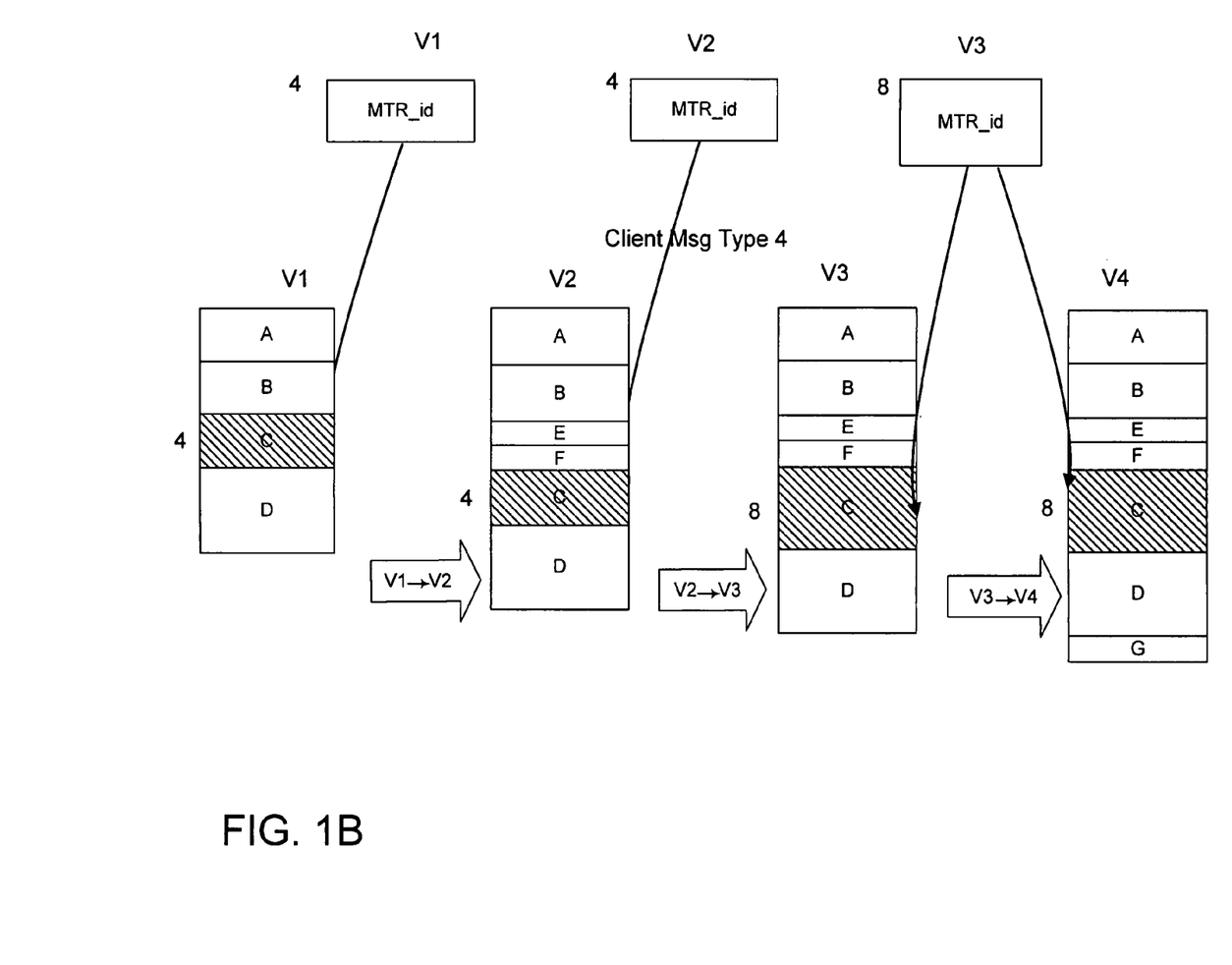
FIG. 1B is a diagram depicting conversion of different versions of a message with a foreign-owned field included in the message.

Another problem occurs for messages that include "foreign-owned fields" as depicted in FIG. 1B. The "foreign-owned field" problem arises when a message that an ISSU client owns contains one or more data fields that are managed and versioned by some other outside entity, referred to here as a "foreign owner". The format and exact contents of the "foreign-owned field" are unknown to the using ISSU client. It only knows the definition of the field and typically it will get this from an opaque typedef in a header file that the owner publishes. The field value(s) will often be used to access or reference data owned and managed by another feature or service and is used by passing the field value(s) to a service or feature for its use. All of this occurs with the user(s) of the foreign-owned field data treating it as an opaque value.

A concrete example of such a relationship exists for all routing clients that make use of a foreign-owned identification field (FO_id) in their messages. They obtain the value and use it, but have no knowledge of what it should look like on the peer when different versions of the image are being executed on the Active and Standby unit during an ISSU upgrade. Any message based communication system can use this infrastructure, including two different processes executing on the same processor that communicate using messages.

FIG. 1B shows an example of an ISSU client that has a message of type 4 which has four versions. Version 1 of the client message uses version 1 of the FO_id, version 2 of the client message uses version 2 of the FO_id, and versions 3 and 4 of the client message use version 3 of the FO_id. The version of the FO_id that is required for a specific version of the client message was determined by the implementation of the foreign owner of FO_id and the client in the first image that supported the client with the particular version of its message type 4.

In this example, the first IOS images that were released supported client message type 4, version 1. Then, in a subsequently released IOS image the client message type 4 version 1 was changed to version 2 where the fields "E" and "F" were added. Coincidentally, the FO_id was also changed to version 2 which is used in the client's type 4, version 2 message.

In yet a later released version of IOS and of the ISSU client, the client's message type 4 is upgraded to version 3. Coincidentally, the FO_id version was also changed to version 3 in that release. As shown, version 3 of the client message uses version 3 of the FO_id and had its message version incremented because the size of the foreign-owned field, "C", has changed between client message version 2 and client message version 3. The client message had to be upgraded to version 3 because the FO_id changed size and therefore the offsets and possibly the alignment in the client message also changed. For that reason the message had to be versioned to the next version number, otherwise its peer would not know that the offsets and alignment had changed.

In the next IOS release, the client upgrades its message type 4 to version 4 because it added field "G". However, the version of the FO_id did not change in that release, so the client type 4 message version 4 still uses version 3 of the FO_id.

The "foreign-owned field" versions are managed separately and may be different from the user message versions. The user of the field has no context as to how to version the "foreign data". If the using client should version its message containing a "foreign-owned field" and send it to the peer, the value, size and format of the "foreign-owned field" may be incorrect if not transformed. But there is no knowledge of how to accomplish this task in the using client transformation functions. In order to allow the using client to transform the foreign-owned data, the data could be tracked by each using client in concert with the foreign owner. But this process would be unscaleable, error prone and inelegant.

Thus, the challenges of managing versioned messages when various fields are managed by different components and therefore are versioned without respect to one another require a scalable, non-error prone solution.

DETAILED DESCRIPTION OF THE EMBODIMENTS

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

As described above, the ISSU facilitates the interoperation of peers using their native message versions utilizing an ISSU infrastructure to allow applications to provide dynamic transformation functions to upgrade or downgrade messages as appropriate based on negotiation results.

For example, negotiation can take place when the Standby processor joins the configuration. In this example, the Standby runs a higher version of IOS and is the up-level and the Active is the down-level. Capability and version negotiation provide a basis for interoperability of feature application peers. The ISSU clients register capabilities, message types and transformation functions, and perform version negotiation.

Figure 2:
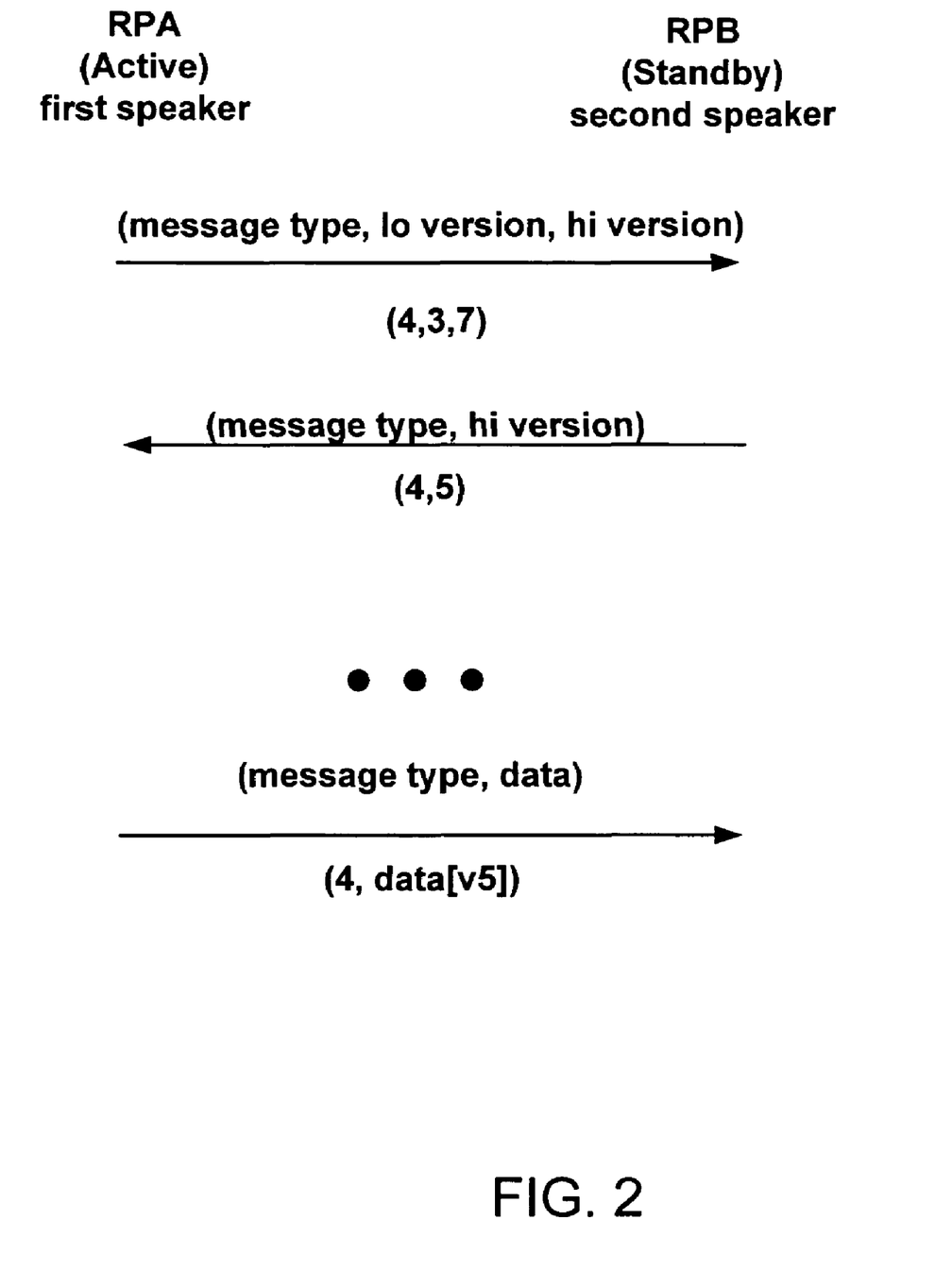
FIG. 2 is a diagram depicting the steps of version negotiation.

A simplified overview of version negotiation will now be described with reference to FIG. 2. The first speaker, in this example Route Processor (RP) A, sends first, informing the second speaker, in this example RP B, of its message type and the lowest and highest versions of the message type it supports. The second speaker then responds with the highest version in the proposed range that can be supported for the message type proposed.

Once negotiation is complete messages can be exchanged. The messages sent contain the message type and the data payload. The version is the highest version supported by both speakers, in this example version 5, which is termed the "negotiated version". Each application communicates with the highest version it supports which is termed the "native version". In this example, the native version of the first speaker is version 7 and the native version of the second speaker is version 5.

The infrastructure is able to upgrade or downgrade between message versions for a particular message type because of transformation function registration. The operation of the transformation functions will now be described with reference to FIG. 3.

Figure 3:
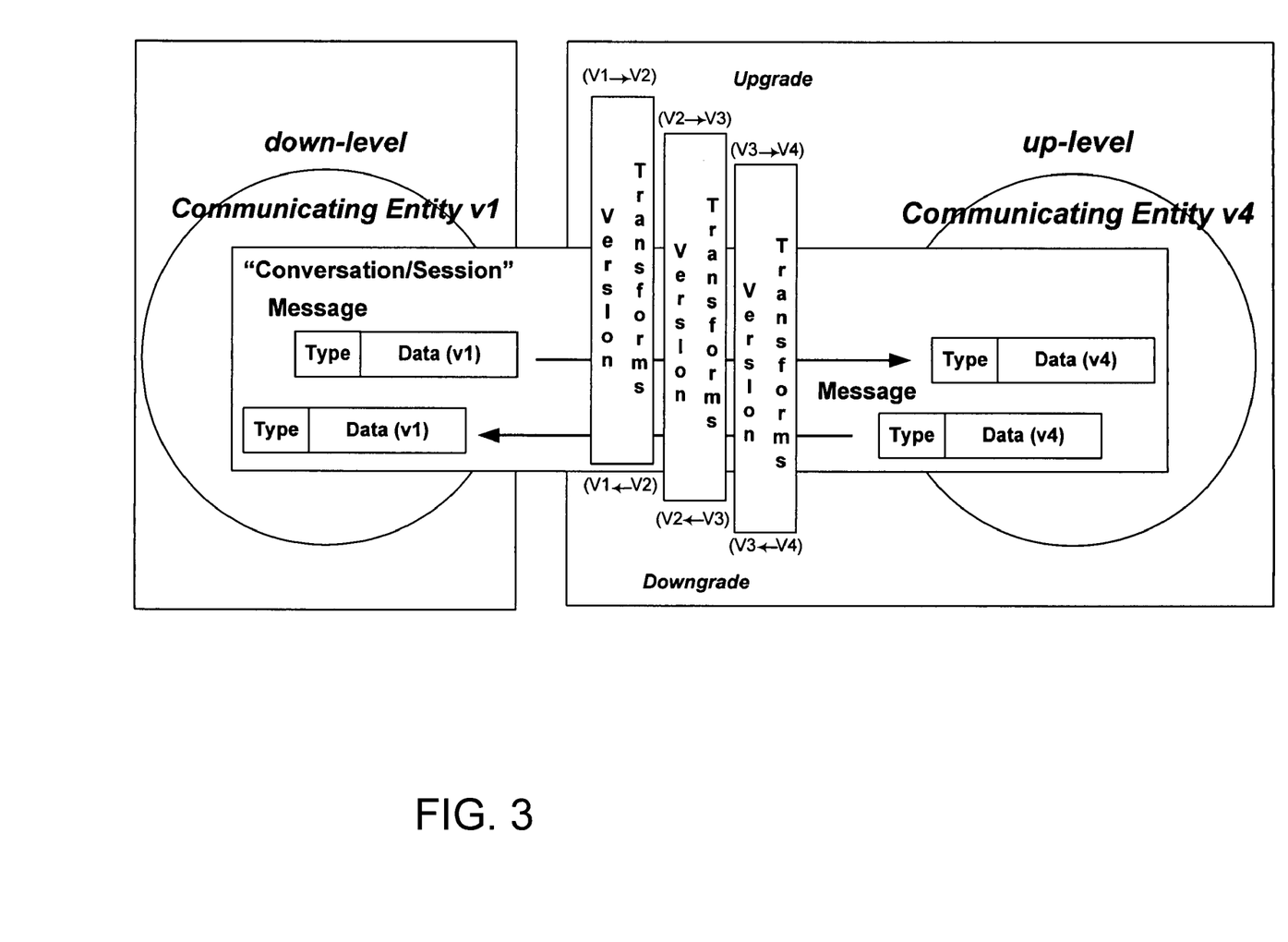
FIG. 3 is a block diagram depicting the version transformation functions and the transformation infrastructure.

In FIG. 3 the down-level Communicating Entity supports a message of type 10 with native version 1. The up-level Communicating Entity supports a message of type 10 with native version 4. Three pairs of transformation functions are registered, one in each pair for upgrade and one in each pair for downgrade, the first transforms between v1 and v2, the second between v2 and v3, and the third between v3 and v4. Note that the conversion functions are paired so that the transformation function works in both directions. The three message transformation functions are chained to effect the transformations between v1 and v4 and V4 and V1 or anywhere in between. As described above, the message types and version transformations are registered when the clients executing in RPs A and B initialize.

Aspects of the existing infrastructure have now been described. An embodiment of an infrastructure for managing any number of resident foreign-owned fields per client message will now be described. This foreign-owned field management feature builds on the existing ISSU infrastructure and requires additions to, but does not change the existing implementation at all for any clients that do not need to make use of this feature and does not change the structure of existing client messages in any way. It is also able to detect and deal with a change in size of the foreign-owned field (although this latter feature is implemented by tools at compile time and by runtime checks). This foreign-owned field management structure is designed to be independent of the rest of the ISSU infrastructure but depends on the ISSU infrastructure and is entirely integrated into it.

In this embodiment, most of the additional code/definitions required of the user clients are in the form of data structures that define tables. The mechanisms are entirely table driven, utilizing the data registered by the using client. Even the new registration function calls simply serve to stitch ISSU data structures together with the appropriate data relating to the foreign-owned fields so that the necessary transformations will take place at the required time. The following embodiments will be described, by way of example, not limitation, utilizing the ISSU infrastructure as the message transformation infrastructure.

In the following, an ISSU client that has messages that include foreign-owned fields is termed the "user" or "using client" of the foreign-owned fields. The client that owns a foreign-owned fields is termed the "owner".

In this embodiment, the owner(s) of foreign-owned field(s) (where the foreign-owned fields can be of any shape and size and are intended to be treated as opaque by the "using" ISSU client) must be full ISSU clients, register each of the fields used by others as a unique message type, version the message appropriately, and establish a session and negotiate with each endpoint with which its "users" will establish sessions. This is to ensure that the client that uses these foreign-owned fields has them formatted correctly for the sending and receiving endpoints just as the rest of its wholly owned messages are when formatted by the client's own transformation functions.

During registration, the using clients are required to identify any owner(s) and their associated ISSU message_id(s) for any "foreign-owned field(s)" in the using clients' messages.

The owning clients define their messages, etc. as is usual for ISSU clients (including any necessary transform functions and some additional information described later). The "using" clients are required to do as follows:

```
rc = issu_reg_msg_type_list (client_id, // ISSU client id
                             entity_id, // it's entity id
                             msg_info_table_size, // msg type table size
                             &msg_info_table ); // -> msg type table
```

Clients which have messages containing "foreign-owned" fields must then register the foreign-owned fields on a per message type basis. The foreign-owned field owners must provide an additional header file where the user clients that need the owner's client id, entity id, and message id of the foreign own filed can be obtained. A typedef that abstracts the size of the foreign owned field, but not its version, are also provided in the header. There can be one or more foreign-owned fields defined per local message type via the new ISSU registration function:

```
rc = issu_reg_msg_type_owner_list (client_id, // ISSU client id
                                    entity_id, // it's entity id
                                    msg_type, // msg type with owned fields
                                    owner_info_table_size,//size of owner table
                                    &owner_info_table); // -> owner info table.
```

The owner list for a message with two foreign-owned fields would be defined as:

```
        static issu_msg_type_owner_list_t owner_info_table [ ] =
{
    { // ---- foreign-owned field 1 ----
    owner_client_id_1, // "owner's" ISSU client id
    owner_entity_id_1, // "owner's" entity id for it's msg
    owner_msg_type_1, // "owner's" msg type
    my_owned_ref_value_1 // value for callback in transforms
```

```
    },
    { // ---- foreign-owned field 2 ----
    owner_client_id_2,
    owner_entity_id_2,
    owner_msg_type_2,
    my_owned_ref_value_2
    }
};
```

The purpose of the owner list is to allow the ISSU infrastructure to connect the current using client's message type (specified in the issu_reg_msg_type_owner_list( ) function call) with the owning ISSU client's message type (specified in the owner_info_table). The required coupling mandates that the using client know the [client_id, entity_id, msg_id] that represents the owner's message describing each foreign-owned field. The purpose of the reference_value is to provide the infrastructure a way to determine which owned field is being referenced (and lookup/find the information concerning it) during the issu_xmit_transform( ) and issu_rcv_transform( ) function calls. The exact use is described more fully below. The ISSU infrastructure builds the owner information off the data structure representing the msg group and types for this (client_id, msg_id) specified in the issu_reg_msg_type_owner_list( ) registration call.

An overview of the foreign-owned field transformation in this embodiment will now be described. The client calls the ISSU transform infrastructure either before sending or after receiving a message using the issu_xmit_transform( ) and issu_rcv_transform( ) function calls respectively. For messages with "foreign-owned" fields, these fields have to be appropriately upgraded or downgraded as well. There are a few issues that must be clearly understood. First, the version of the foreign-owned field has no relationship to any version or versions of the current client's message; foreign-owned fields are versioned entirely independently. It is neither scalable nor maintainable to have each message client track versions of the foreign-owned fields for each of its messages, especially considering that there could be multiple versions of the foreign-owned field even when the current client's message does not change its version. Besides the impracticality of having all of this embedded information tracked by each client, the infrastructure necessary to provide this functionality would be complex and difficult to both implement and use.

Instead, the approach taken is to have the infrastructure manage the complete transformation (upgrade or downgrade) of the foreign-owned fields (with the cooperation and normal ISSU infrastructure provided by the owner) independently of the transformation of the current client message. (This approach is designed to work even when the current client message requires no upgrade or downgrade but the foreign-owned field does and vice-versa.) However, this scheme does rely on the implementation of new client registered data that allows the infrastructure to get and set the foreign-owned field when called by the client.

An ISSU client invokes the transform infrastructure via the function calls issu_xmit_transform( ) before sending a message and issu_rcv_transform( ) after receiving a message. Each returns an appropriately transformed (possibly downgraded on send or upgraded on receive) message by internally invoking the appropriate client-provided registered transform functions based on the results of the negotiation that the client performed with its peer on the endpoint represented by my_session_id.

```
rc = issu_xmit_transform (my_session_id, // client's ISSU session id
                         msg_type, // type for message
                         ptr2mymsg); // -> msg to send
rc = issu_rcv_transform (my_session_id, // client's ISSU
                         session id
                         &my_msg_type, // -> where to put msg type
                         &ptr2mymsg); // -> -> msg
```

When the ISSU infrastructure receives control, the first thing it does is process the foreign-owned fields in the input message (the received message, possibly to be upgraded, when called from issu_rcv_transform( ) or the message to be sent, possibly to be downgraded, when called from issu_xmit_transform( )). It already knows the results of the negotiation for this client on this session (my_session_id) so it knows both the "native" version of the message (the highest version registered) and the version of the message that is understood by the peer (the negotiated version) which may or may not be the same.

When called by issu_xmit_transform( ) the input message is the native version and the output message is the negotiated version; when called by issu_rcv_transform( ) the input message is the negotiated version and the output message is the native version. The client has previously registered the owned fields and their offsets and lengths for each message version for each message type. If there are any foreign-owned fields registered for the input message, the ISSU infrastructure code finds the corresponding owner's session negotiation results (using the my_session_id, owner_client_id, owner_entity_id and owner_msg_type from the issu_reg_msg_type_owner_list( ) for this msg_type) and uses the results to determine the maximum size of the message buffer required for the result of the foreign owner's message transforms for this data with the same endpoint.

The ISSU infrastructure then obtains the required memory, copies the foreign-owned data from the input client message at the specified offset and length for that field, and calls the foreign field owner's issu_xmit_transform( ) or issu_rcv_transform( ) for this message, depending on how the infrastructure was called by the client originally. This must be done (and cannot be optimized out) even if the owner's native and negotiated version are the same. This results in a correctly upgraded or downgraded message/foreign-owned field value in the data area to be copied back to the client message at the specified offset and for the specified length in the final transformed client message.

Once all foreign-owned fields have been processed in this way for the input message, the message is then processed through the client's transforms. There may be any number of these defined, including none. If there are transforms defined, the client must carefully copy the fields that it owns in-place as it transforms the message. It must ignore the value of any foreign-owned fields as these have already been transformed outside of the client's transform functions and the correct result will be placed in the final message by the infrastructure code. This will avoid any problem with changing size and what to do about it during the client transforms (except as it results in different offsets for client fields in the client messages).

While a change in size must be reflected in the client message where the size change of the foreign-owned field took place, the client code never has to be concerned with processing or providing a value for these fields. It is always safe to leave them untouched during processing; the message structure, however, is required to reserve the correct space and alignment for the result and will cause all of the client data to be placed at the correct offsets.

When all of the client transforms are complete and the final version of the message has been produced, but before returning, the ISSU infrastructure code will again find all of the foreign-owned field definitions for this message version along with their offsets and lengths and copy the values that were produced by the owner's transformations to the correct offsets and for the correct lengths into the final message. If malloc( )'d on entry, the message buffer for the foreign-owned field(s) are now free( )'d. This process produces a correctly formatted and transformed message for all fields. The message is returned to the client from either issu_rcv_transform( ) or issu_xmit_transform( ). Note that in no case does the using client have anything to do with the transformation of the foreign-owned field that is performed automatically by the infrastructure using the definitions provided by the using client.

An embodiment of the procedure for registering foreign-owned fields will now be described. Registration of the foreign-owned fields and their offsets in a particular message type is defined as shown in the following function call. The ISSU infrastructure associates this information with the specified message type and version for the specified ISSU client and entity:

```
rc = issu_reg_owner_offset_list (my_client_id, // for this client id
     my_entity_id, // for this entity id
     sizeof(my_owned_msgs_and_fields), // size of table
     &my_owned_msgs_and_fields_table); // all fields & msgs.
```

The foreign-owned fields, sizes of messages, and all fields and messages for version 1 of a message type 4 with three versions, each containing two foreign-owned fields, would be defined as:

```
                    // owned field offsets and lengths for v1 of type 4 message
             static ISSU_client_msg_owned_field_data_item_t
my_owned_fields_T4_msg_v1[ ] =
{
    { // -- first owned field --
    my_owned_ref_value_1, // owned field reference value
    offsetof(my_msg_T4_msg_v1_t, owned_field1),// offset into v1 of msg
    sizeof(FOF_field_v1) // size of field in this version
    },
    { // -- second owned field --
    my_owned_ref_value_2, // owned field reference value
    offsetof(my_msg_T4_msg_v1_t, owned_field2),// offset into v1 of msg
    sizeof(XXX_field_v1) // size of field in this version
```

```
        }
};
        static ISSU_client_msg_owned_field_data_t my_owned_data_T4_msg_v1 =
{
        my_msg_T4_id, // msg type
        my_msg_T4_msg_version_1, // msg version
        sizeof(my_owned_fields_T4_msg_v1), // size (owned fields array this
version
        &my_owned_fields_T4_msg_v1[0] // -> owned fields offsets/lengths array
};
```

Figure 4:
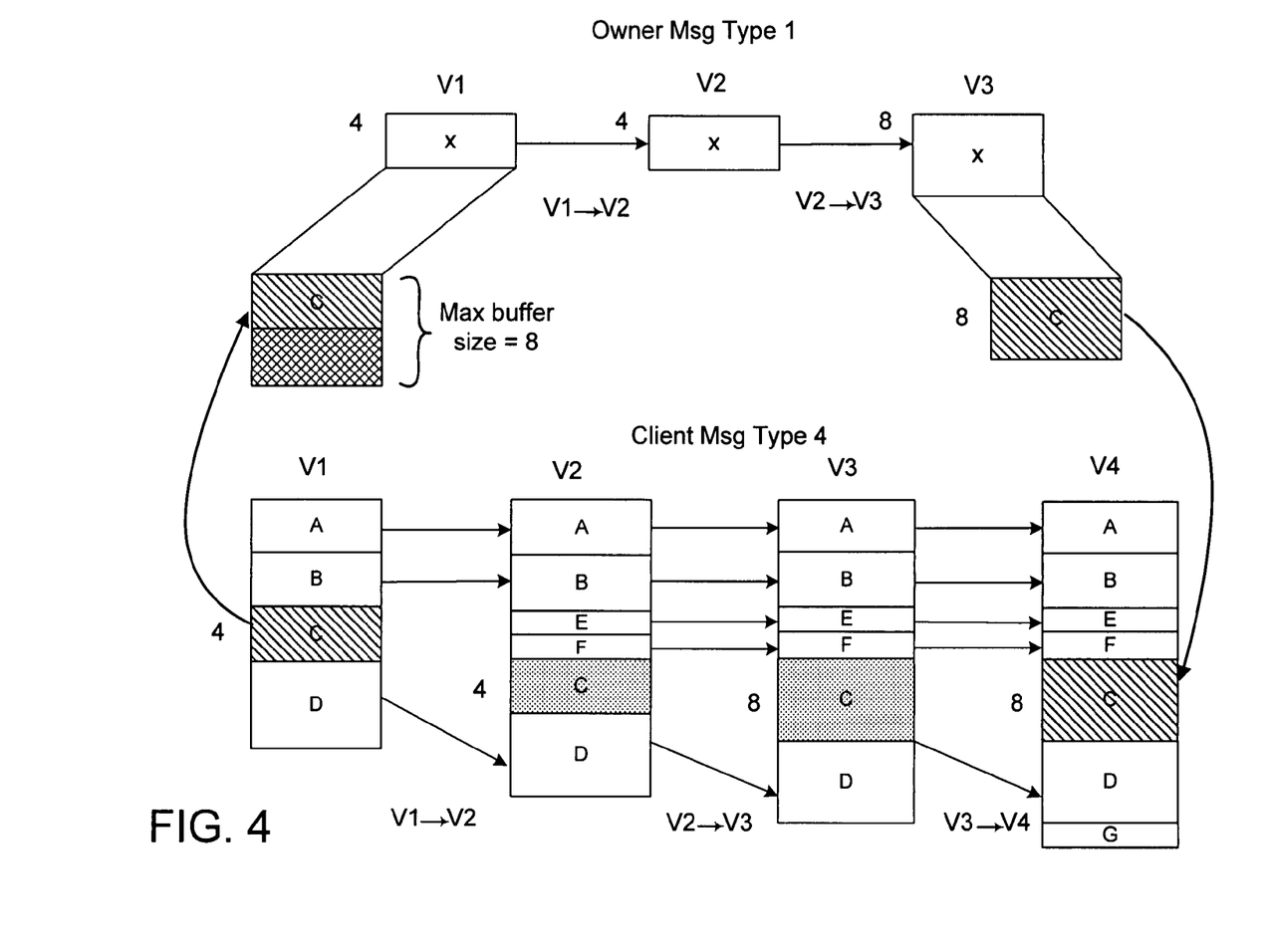
FIG. 4 is diagram depicting the transformation of a message including a foreign-owned field.

An example of how this embodiment upgrades or downgrades a message containing a foreign-owned field will now be described with reference to FIG. 4. FIG. 4 illustrates an upgrade on a received message because of the direction of the versioning. A downgrade would be described by reversing the directions of the arrows.

The bottom portion of FIG. 4 shows a series of versions of a client type 4 message (V1, V2, V3, and V4). There are three registered client upgrade transform functions to accomplish the transition from a V1 to a V4 message (V1→V2, V2→V3, and V3→V4). (There are also an equivalent set of downgrade functions registered, V1←V2, V2←V3, and V3←V4, but these are not germane to the current example.) The client transforms the client fields in the message from one version to another in place, transforming them as appropriate (e.g., fields "A", "B" and "D" from version 1 to version 2) or, creates the value for a newly introduced field (e.g., fields "E" and "F" in version 2).

The foreign-owned field, "C", is not copied or manipulated at all by the client transform functions. The "placeholder" for "C" is reserved in each client message structure definition based on a typedef version defined by the owner (in its header file, and different for each change in size of the foreign-owned field). The client need only use a new definition provided by the owner when the size of the field changes; any changes within the foreign-owned field that do not result in a size change do not affect the client message because these fields are opaque to the client and are not manipulated or copied by it.

In this example, the size of "C" does not change between V1 and V2, so the same definition of the field is used by the client in each user structure. However, the size of "C" does change between V2 and V3 of the client message. For V3 of the message, the client reserves the correct space (and alignment) for the foreign-owned field using the correct (new) version of owner definition which the owner publishes. This same definition of the foreign-owned field is used for both V3 and V4 of the client message.

The following is a detailed description of the transformation of the foreign-owned field. When the infrastructure initially gets called (in this case of a message upgrade via issu_rcv_transform( ) or a message downgrade via issu_xmit_transform( )), it knows the version of the input message for which the client has published the offset and it knows (or can derive, as will be discussed later) the length of the foreign-owned field(s) in this version of the message. It knows the native and negotiated versions of the message (as explained earlier). Using this information, the foreign-owned field information about "C" from the issu_reg_msg_type_owner_list( ) registration and the session information for the client's session, the infrastructure can retrieve the owner's session negotiation results to the same endpoint for the owner's message type that corresponds to the foreign-owned field, along with the maximum size of the buffer required to hold the result.

It then copies the owned field from the client input message, invokes the owner's transform functions (for its message type 1 with content "X" and its transforms it through V1→V2 and V2→V3) which produce the correct version of the foreign-owned field in the copy-in/copy-out buffer (which the client refers to as "C"). Note that the owner message versions and data size change independently of the client(s) that use it.

When the client has finished its transformations and returns to the infrastructure, the infrastructure copies the [possibly] updated value for "C" into the output message using the client's registered information for the foreign-owned field information, "C", from the issu_reg_msg_type_owner_list( ). This completes the entire message transformation. The infrastructure then returns this final version of the client message to the client as the result of the issu_rcv_transform( ) or issu_xmit_transform( ) calls.

It should be noted that, in this embodiment, handling data between two versions of a message within a transform function is no different for messages with foreign-owned fields than it is for messages that contain only client data. Whenever fields are added, deleted or change size between two versions, careful copying must be used to ensure that data is not destroyed before it is needed since the transform functions are performing a copy-in-place operation. For example, in the case shown in FIG. 4, the transform from V1→V2 must copy "D" from V1 to V2 of the message before "E" and "F" are added to ensure that the data representing "D" is not destroyed by the new data. The direction and order of copy will depend on the changes between the two messages. For example, if "D" was followed by another field "H" in V1 and "D" was now at a greater offset than in V1, "H" would need to be copied to V2 before "D" was copied. These considerations are no different when foreign-owned fields are involved. Since a change in size of a foreign-owned field requires versioning of the client message, the client transforms know when the size has changed. Maintaining all foreign-owned fields at the back end of the client messages, by always adding client fields ahead of them, will obviate considerations specifically for foreign-owned fields (because the infrastructure uses a copy-out before the transforms are invoked and a copy-in after the transforms are done scheme) but will not change the issues for client owned fields. Careful copies are always required from version to version. Careful consideration needs to be given to any use of block copy operations.

An embodiment of a procedure for handling the addition or deletion of a foreign field between message versions will now be described. As the example in FIG. 4 shows, it is possible to add (e.g., fields "E" and "F") or delete fields in a client message as the version changes due to changing requirements. Just as a client owned field could be added or deleted, a foreign-owned field could be introduced or removed during various client message versions. This requires some additional infrastructure and client code to handle this corner case.

The technique described for this embodiment does not require that the client have any additional information over what it would already need to know to add or delete a field. Since the infrastructure knows the native version of the message (the format that will be sent and will be presented on receive) and the version of the message its peer expects to send and receive, it will match the owned fields in each version to determine if a foreign-owned field has been added or deleted between the two (in this embodiment, an added field will be deleted in the other direction and vice-versa).

In this embodiment, if the foreign-owned field is required in the final message (either upgraded on receive or downgraded on send) and is not present in the original message (either the original received message version or the original send message version), then a client callback is invoked to provide the initial value which will be used in the normal manner with respect to the owner transforms. The client would have to have a way to provide the initial version of this field when it was introduced in any case. This just requests that it does so on the callback request.

The client registers the callback function only if it needs this functionality. It can register this callback function any time after the owner_info_table[ ] has been registered.

```
rc = issu_reg_owner_callback
(reference_val,//fromowner_info_table[ ]
                    my_owner_get_field_func); // get field func
```

The callback function is invoked automatically by the infrastructure when required, as shown below. If the function is required because a foreign-owned field has been introduced somewhere in the middle of the message versions, is required in the final version, and one has not been registered, a runtime error will occur.

```
rc = (my_owner_get_field_func) (client_ctx, // -> client's context
                    msg_type, // client's message type
                    ptr2mymsg, // -> client msg
                    reference_val, // from owner_info_table [ ]
                    &ptr2place); // -> where to copy field.
```

When a field is deleted such that it occurs in the input message (either send or receive) but does not occur in the message version presented back to the client at the end of the issu_rcv_transform( ) or issu_xmit_transform( ), it is quietly discarded and no initial version is needed or obtained by the ISSU infrastructure. However, because there will be some cases where it will be required, depending on the version negotiated with the client at the peer endpoint, the client must register the callback if this condition has the possibility of existing.

Since the implementation of this part of the functionality only has local effect (i.e., the effect of the implementation cannot be observed from outside this endpoint), the implementation can be changed in any release without affecting interoperability should requirements change.

Much of the setup for processing the foreign-owned fields in the issu_rcv_transform( ) or issu_xmit_transform( ) can be done directly after the client's negotiation is complete. If the client's negotiation is successful (i.e., the client negotiates "compatible"), the infrastructure should then check for any foreign-owned fields in the messages used on this session. If there are any, the infrastructure should match the foreign-owned fields in the send and receive versions (the infrastructure knows these message versions from the results of the negotiation and it knows the foreign-owned fields in the messages and the message versions from the client registration). If a field appears in the send version and does not appear in the receive version, for the downgrade case (send), then this foreign-owned field does not have to be transformed on send because it is not required by the peer instance. For the receive case (upgrade), the special owner_get_field_func( ) function needs to be called first to create the field value(s) and then the owner transforms need to be called. If the foreign-owned field appears in the receive version but not in the send version, then the special owner_get_field_func( ) function needs to be called for send (downgrade) and does not need to be called on receive. A foreign-owned field that exists only in the intermediate versions of a message (i.e., it was added after the negotiated version and deleted before the current version), need never be transformed and the function will not be called.

In order to process the foreign-owned field, the results of the owners negotiation must be referenced. Since the endpoint for the client's session is known and the owner's ISSU client id and entity id are known, these results can be found by the ISSU infrastructure. If the owner's negotiation has not completed, the client's negotiation is marked as failed. If the owner's negotiation failed, the client's negotiation is also marked as failed. This makes the client that depends on the owned field incompatible as well. This requires all owners to complete their negotiations before any using clients require the results. This is an application ordering issue and is not managed, but is detected, by the infrastructure.

All of the information necessary to process the owned field(s) for a set of versioned client messages can be cached in the client session so that they can be easily referenced and used during the issu_rcv_transform( ) or issu_xmit_transform( ). As mentioned elsewhere, even the required buffer for transforming an owned field could be pre-allocated at this point (this would work well, especially for small fields, which are expected to be the normal case).

It should be noted that even if the current and negotiated versions of the owned message are the same, the issu_rcv_transform( ) or issu_xmit_transform( ) function of the owner cannot be optimized out and must be called as the owner message might also have one or more embedded fields that need to be transformed. If it's transform function was not called, there would be no opportunity for the embedded owned field(s) to be transformed.

It is the responsibility of the owners of foreign-owned fields to ensure that their transform functions (as called by he issu_rcv_transform( ) or issu_xmit_transform( ) functions) can correctly operate when called in the context of the using client.

The ISSU tools that recognize when data in messages has changed and require the message to be versioned will have to be modified to understand foreign-owned fields and require a change in the version of the client message iff the owned field has changed size; i.e., an internal change to an owned field by the owner is completely opaque to the client message that uses it and will only require a new version of the client message when the size of the owned field changes because it will cause the offsets of the client data in the client message to change. The value of the owned field will be taken care of and correctly transformed by the owner irrespective of the client message version because the owner has negotiated the correct result/version with the same endpoint. The client will need to use the correct size definition (i.e., owner-provided generic size typedef for all owner versions of a given size) of the foreign-owned field in its new version.

The following is a list of some other positive side effects of the approach described:

a) There are no length restrictions on transformed fields.

b) Parts of foreign-owned fields can be owned by other foreign owners to any nesting depth necessary.

c) If the owner of any field has negotiated incompatible, it is possible to automatically mark all clients that depend on this owner as incompatible also (because transforms on messages containing these foreign-owned fields will fail).

Figure 5:
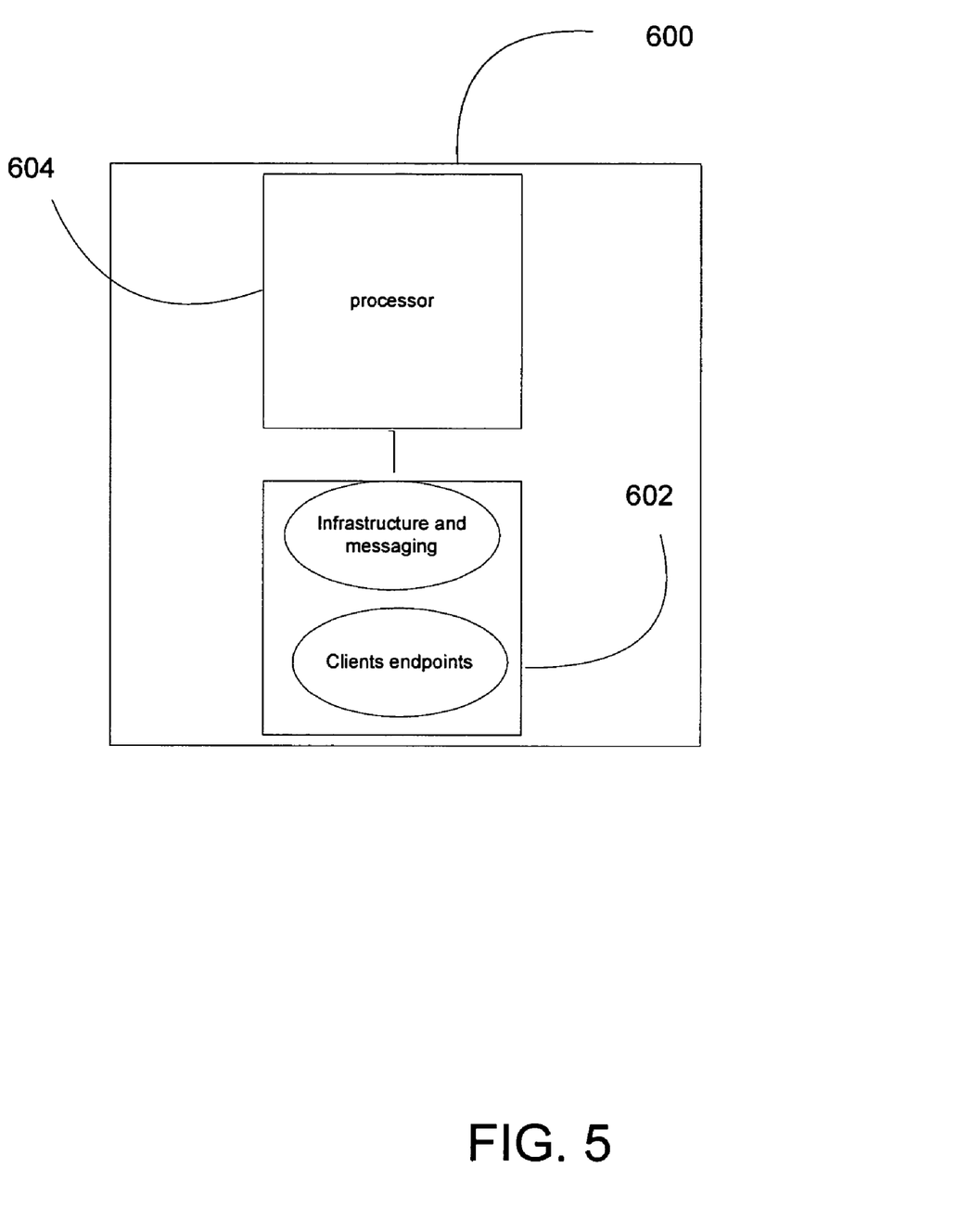
FIG. 5 depicts a computer system suitable for implementing embodiments of the invention.

FIG. 5 shows a system block diagram of computer system 600 that may be used to execute software of an embodiment of the invention. The computer system 600 includes memory 602 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 600 can further include subsystems such as a central processor 604, and one or more network interfaces (not shown). Other computer systems suitable for use with the invention may include additional or fewer subsystems.

The memory 604 stores program code for implementing the infrastructure and messaging and code for implementing client processes.

The invention has now been described with reference to the preferred embodiments. Alternatives and substitutions will now be apparent to persons of skill in the art. For example, the above described embodiments utilize an ISSU infrastructure. However, the invention can be practiced in any system that includes an infrastructure for stateful operation of peer applications. Accordingly, it is not intended to limit the invention except as provided by the appended claims.

What is claimed is:

1. A method comprising:

at an owner client of a stateful switch over infrastructure, where the owner client owns a particular owned field that is included in a message sent between first and second endpoints, where the first endpoint is a sending user client of the stateful switch over infrastructure that is sending a message of a particular message type and a particular version number and where the message includes a foreign-owned field which is the owned field owned by the owner client and the second endpoint is a receiving user client of the stateful switch over infrastructure:

registering with the stateful switch over infrastructure the size of the particular owned field included in all versions of messages of the particular message type and the offset of the owned field in the message;

at the sending and receiving user clients of the stateful switch over infrastructure:

registering with the stateful switch over infrastructure the message of the particular message type containing the particular foreign-owned field;

registering with the infrastructure user client transformation functions for the user client, where the user client transformation functions transform between different versions of a particular message type;

reserving a placeholder in the message of the particular message type for the foreign-owned field, with the placeholder having a size determined by the information registered by the owner client;

at the stateful switch over infrastructure:

copying the foreign-owned field from an input message of a user client;

invoking transformation functions registered by the user clients to transform the message of the particular type between different versions:

invoking transformation functions of the owner client to transform the foreign-owned field between versions to create a transformed foreign-owned field;

copying the transformed foreign-owned field into the placeholder of the message after the message has been transformed.

2. The method of claim 1 where the first and second endpoints are processes executed on different processors in a redundant system.

3. The method of claim 1 further comprising:

at the user client of the stateful switch over infrastructure:

registering a callback function; and at the stateful switch over infrastructure:

calling the callback function to provide an initial value of the foreign-owned field if the foreign-owned field is not included in the first message but is included in the second message.

4. The method of claim 1 further comprising:

at the owner client:

providing a header file for the user client including information necessary to register the foreign-owned field with the stateful switch over infrastructure.

5. The method of claim 4 where the header includes a typedef field abstracting the size of the foreign-owned field.

6. A system comprising:

at an owner client of a stateful switch over infrastructure, where the owner client owns a particular owned field that is included in a message sent between first and second endpoints, where the first endpoint is a sending user client of the stateful switch over infrastructure that is sending a message of a particular message type and a particular version number and where the message includes a foreign-owned field which is the owned field owned by the owner client and the second endpoint is a receiving user client of the stateful switch over infrastructure:

means for registering with the stateful switch over infrastructure the size of the particular owned field included in all versions of messages of the particular message type and the offset of the owned field in the message;

at the sending and receiving user clients of the stateful switch over infrastructure:

means for registering with the stateful switch over infrastructure the message of the particular message type containing the particular foreign-owned field;

means for registering with the infrastructure user client transformation functions for the user client, where the user client transformation functions transform between different versions of a particular message;

means for reserving a placeholder in the message of the particular message type for the foreign-owned field, with the placeholder having a size determined by the information registered by the owner client;

at the stateful switch over infrastructure:

means for copying the foreign-owned field from an input message of a user client;

means for invoking transformations functions registered by the user clients to transform the message of the particular type between different versions;

means for invoking transformation functions of the owner client to transform the foreign-owned field between versions to create a transformed foreign-owned field;

means for copying the transformed foreign-owned field into the placeholder of the message after the message has been transformed.

7. An article of manufacture comprising:

one or more tangible computer readable storage media encoded with software comprising computer executable instructions and with the software operable to:

at an owner client of a stateful switch over infrastructure, where the owner client owns a particular owned field that is included in a message sent between first and second endpoints, where the first endpoint is a sending user client of the stateful switch over infrastructure that is sending a message of a particular message type and a particular version number and where the message includes a foreign-owned field which is the owned field owned by the owner client and the second endpoint is a receiving user client of the stateful switch over infrastructure:

register with the stateful switch over infrastructure the size of the particular owned field included in all versions of messages of the particular message type and the offset of the owned field in the message;

at the sending and receiving user clients of the stateful switch over infrastructure:

register with the stateful switch over infrastructure the message of the particular message type containing the particular foreign-owned field;

register with the infrastructure user client transformation functions for the user client, where the user client transformation functions transform between different versions of a particular message type;

reserve a placeholder in the message of the particular message type for the foreign-owned field, with the placeholder having a size determined by the information registered by the owner client;

at the stateful switch over infrastructure:

copy the foreign-owned field from the an input message of a user client;

invoke transformation functions registered by the user clients to transform the message of the particular type between different versions;

invoke transformation functions of the owner client to transform the foreign-owned field between versions to create a transformed foreign-owned field;

copy the transformed foreign-owned field into the placeholder of the message after the message has been transformed.

8. The article of manufacture of claim 7 encoded with software that when executed is further operable to:

at the user client of the stateful switch over infrastructure:

register a callback function; and at the stateful switch over infrastructure:

call the callback function to provide an initial value of the foreign-owned field if the foreign-owned field is not included in the first message but is included in the second message.

9. The article of manufacture of claim 7 encoded with software when executed further operable to:

at the owner client:

provide a header file for the user client including information necessary to register the foreign-owned field with the infrastructure.

10. The article of manufacture of claim 9 where the header file includes a typedef field abstracting the size of the foreign-owned field.

11. An apparatus comprising:

a hardware memory holding code for implementing a stateful switch over infrastructure process, an owner process and first and second endpoint processes; and one or more processors coupled to the hardware memory for executing the stateful switch over infrastructure process, the owner process, and first and second endpoint processes and configured to:

execute the owner process at an owner client of a stateful switch over infrastructure, where the owner client owns a particular owned field that is included in a message sent between first and second endpoints, where the first endpoint is a sending user client of the stateful switch over infrastructure that is sending a message of a particular message type and a particular version number and where the message includes a foreign-owned field which is the owned field owned by the owner client and where the second endpoint is a receiving user client of the stateful switch over infrastructure, to register with the stateful switch over infrastructure the size of the particular owned field included in all versions of messages of the particular message type and the offset of the owned field in the message, execute the first and second endpoint processes at the sending and receiving user clients of the stateful switch over infrastructure to register with the infrastructure the message of the particular message type containing the particular foreign-owned field, register with the infrastructure user client transformation functions for the user client, where the user client transformation functions transform between different versions of a particular message type, reserve a placeholder in the message of the particular message type for the foreign-owned field, with the placeholder having a size determined by the information registered by the owner client, and execute the infrastructure process at the stateful switch over infrastructure to copy the foreign-owned field from an input message of a user client to invoke transformation functions registered by the user clients to transform the message of the particular type between different versions to invoke transformation functions of the owner client to transform the foreign-owned field between versions to create a transformed foreign-owned field and to copy the transformed foreign-owned field into the placeholder of the message after the message has been transformed.

* * * * *